United States Patent
Wynn et al.

(10) Patent No.: US 8,549,588 B2
(45) Date of Patent: Oct. 1, 2013

(54) SYSTEMS AND METHODS FOR OBTAINING NETWORK ACCESS

(75) Inventors: Simon Wynn, Redwood City, CA (US); John Gordon, Alameda, CA (US)

(73) Assignee: Devicescape Software, Inc., San Bruno, CA (US)

( * ) Notice: Subject to any disclaimer, the term of this patent is extended or adjusted under 35 U.S.C. 154(b) by 837 days.

(21) Appl. No.: 11/899,638

(22) Filed: Sep. 6, 2007

(65) Prior Publication Data

US 2008/0060064 A1 Mar. 6, 2008

Related U.S. Application Data

(60) Provisional application No. 60/824,756, filed on Sep. 6, 2006.

(51) Int. Cl.
- *G06F 7/04* (2006.01)
- *G06F 15/16* (2006.01)
- *G06F 17/30* (2006.01)
- *G06F 15/173* (2006.01)
- *H04L 29/06* (2006.01)
- *H04L 9/32* (2006.01)
- *H04N 7/16* (2011.01)

(52) U.S. Cl.
USPC ....... 726/5; 726/4; 726/28; 340/5.8; 713/156; 713/169; 380/277; 709/223; 709/225

(58) Field of Classification Search
USPC .......... 726/5, 7, 28–30, 4; 340/5.8; 713/150, 713/155–156, 168–169; 380/270, 277–279, 380/286; 709/223, 225
See application file for complete search history.

(56) References Cited

U.S. PATENT DOCUMENTS

| | | | | |
|---|---|---|---|---|
| 6,151,628 A | * | 11/2000 | Xu et al. | 709/225 |
| 6,161,185 A | * | 12/2000 | Guthrie et al. | 726/5 |
| 6,233,577 B1 | | 5/2001 | Ramasubramani et al. | |
| 6,799,038 B2 | | 9/2004 | Gopikanth | |
| 6,822,955 B1 | | 11/2004 | Brothers et al. | |
| 6,871,284 B2 | | 3/2005 | Cooper et al. | |
| 6,961,857 B1 | * | 11/2005 | Floryanzia | 726/14 |

(Continued)

FOREIGN PATENT DOCUMENTS

| | | |
|---|---|---|
| EP | 1770940 | 4/2007 |
| GB | 2441350 | 3/2008 |

(Continued)

OTHER PUBLICATIONS

PCT International Search Report and Written Opinion dated Jul. 18, 2008, for International Application No. PCT/US07/19464.

(Continued)

*Primary Examiner* — Carolyn B Kosowski
(74) *Attorney, Agent, or Firm* — Sheppard, Mullin, Richter & Hampton LLP (57) ABSTRACT

Exemplary systems and methods for providing a network credential in order to access a communication network are provided. In exemplary embodiments, a digital device attempting to access the communication network receives an authentication request from the network device. An authentication record based on the authentication request is retrieved from a credential server. The network credential is then provided within the authentication record and transmitted as an authentication response to the network device. Upon authentication by the network device, the digital device is provided access to the communication network.

27 Claims, 8 Drawing Sheets

(56) References Cited

U.S. PATENT DOCUMENTS

| | | | |
|---|---|---|---|
| 7,286,113 B1* | 10/2007 | Lapstun et al. | 345/158 |
| 7,360,087 B2 | 4/2008 | Jorgensen et al. | |
| 7,395,083 B2 | 7/2008 | Buckley | |
| 7,409,543 B1* | 8/2008 | Bjorn | 713/155 |
| 7,437,755 B2 | 10/2008 | Farino et al. | |
| 7,457,950 B1* | 11/2008 | Brickell et al. | 713/156 |
| 7,461,257 B2 | 12/2008 | Olkin et al. | |
| 7,469,139 B2 | 12/2008 | van de Groenendaal | |
| 7,568,220 B2 | 7/2009 | Burshan | |
| 7,661,128 B2 | 2/2010 | Chen et al. | |
| 7,685,264 B2 | 3/2010 | Tumsi Dayakar et al. | |
| 7,810,143 B2* | 10/2010 | Ruzyski et al. | 726/5 |
| 7,898,977 B2 | 3/2011 | Roese et al. | |
| 7,920,531 B2 | 4/2011 | Gupta et al. | |
| 7,930,384 B1 | 4/2011 | Lester et al. | |
| 8,074,259 B1 | 12/2011 | Levy et al. | |
| 8,285,992 B2 | 10/2012 | Mathur et al. | |
| 8,453,225 B2* | 5/2013 | Agarwal et al. | 726/8 |
| 2001/0034837 A1 | 10/2001 | Kausik et al. | |
| 2002/0194501 A1 | 12/2002 | Wenocur et al. | |
| 2002/0199096 A1 | 12/2002 | Wenocur et al. | |
| 2003/0004994 A1 | 1/2003 | Kamrowski et al. | |
| 2003/0097592 A1 | 5/2003 | Adusumilli | |
| 2003/0135765 A1* | 7/2003 | Hind et al. | 713/202 |
| 2003/0163740 A1* | 8/2003 | Thjai et al. | 713/202 |
| 2003/0169713 A1 | 9/2003 | Luo | |
| 2003/0188201 A1 | 10/2003 | Venkatarampappa | |
| 2003/0204748 A1 | 10/2003 | Chiu | |
| 2003/0217137 A1 | 11/2003 | Roese et al. | |
| 2004/0003060 A1 | 1/2004 | Asoh et al. | |
| 2004/0003081 A1 | 1/2004 | Justus | |
| 2004/0031058 A1 | 2/2004 | Reisman | |
| 2004/0103282 A1 | 5/2004 | Meier et al. | |
| 2004/0105433 A1 | 6/2004 | Seo | |
| 2004/0122959 A1 | 6/2004 | Lortz | |
| 2004/0162818 A1 | 8/2004 | Shaw | |
| 2004/0168090 A1* | 8/2004 | Chawla et al. | 713/201 |
| 2004/0193707 A1 | 9/2004 | Alam et al. | |
| 2005/0021781 A1 | 1/2005 | Sunder et al. | |
| 2005/0059416 A1 | 3/2005 | Ono | |
| 2005/0066033 A1 | 3/2005 | Cheston et al. | |
| 2005/0097051 A1 | 5/2005 | Madill, Jr. et al. | |
| 2005/0144237 A1 | 6/2005 | Heredia et al. | |
| 2005/0147060 A1 | 7/2005 | Buckley | |
| 2005/0177750 A1* | 8/2005 | Gasparini et al. | 713/201 |
| 2005/0232189 A1 | 10/2005 | Loushine | |
| 2005/0232209 A1 | 10/2005 | Buckley et al. | |
| 2005/0246431 A1 | 11/2005 | Spitaels | |
| 2005/0260973 A1 | 11/2005 | Van de Groenendaal | |
| 2006/0020684 A1 | 1/2006 | Mukherjee et al. | |
| 2006/0026289 A1 | 2/2006 | Lyndersay et al. | |
| 2006/0047830 A1 | 3/2006 | Nair et al. | |
| 2006/0048213 A1 | 3/2006 | Cheng et al. | |
| 2006/0048214 A1 | 3/2006 | Pennington et al. | |
| 2006/0069782 A1 | 3/2006 | Manning et al. | |
| 2006/0123133 A1 | 6/2006 | Hrastar | |
| 2006/0130140 A1 | 6/2006 | Andreev et al. | |
| 2006/0135155 A1 | 6/2006 | Chung et al. | |
| 2006/0149844 A1 | 7/2006 | Droz et al. | |
| 2006/0174127 A1 | 8/2006 | Kalavade et al. | |
| 2006/0187858 A1 | 8/2006 | Kenichi et al. | |
| 2006/0200503 A1 | 9/2006 | Dosa et al. | |
| 2006/0215622 A1 | 9/2006 | Abdel-Kader et al. | |
| 2006/0221919 A1 | 10/2006 | McRae et al. | |
| 2007/0011725 A1 | 1/2007 | Sahay et al. | |
| 2007/0019670 A1 | 1/2007 | Falardeau | |
| 2007/0054654 A1 | 3/2007 | Jones | |
| 2007/0073817 A1* | 3/2007 | Gorty | 709/206 |
| 2007/0076612 A1 | 4/2007 | Iyer et al. | |
| 2007/0081477 A1 | 4/2007 | Jakkahalli et al. | |
| 2007/0091861 A1 | 4/2007 | Gupta et al. | |
| 2007/0113269 A1 | 5/2007 | Zhang | |
| 2007/0124490 A1 | 5/2007 | Kalavade et al. | |
| 2007/0127423 A1 | 6/2007 | Ho | |
| 2007/0171910 A1 | 7/2007 | Kumar | |
| 2007/0209065 A1 | 9/2007 | Branam et al. | |
| 2007/0256122 A1* | 11/2007 | Foo et al. | 726/5 |
| 2007/0270129 A1 | 11/2007 | Luo | |
| 2007/0275701 A1 | 11/2007 | Jonker | |
| 2008/0016230 A1 | 1/2008 | Holtmanns et al. | |
| 2008/0037715 A1 | 2/2008 | Prozeniuk et al. | |
| 2008/0060064 A1 | 3/2008 | Wynn et al. | |
| 2008/0060065 A1 | 3/2008 | Wynn et al. | |
| 2008/0144589 A1 | 6/2008 | Buckley | |
| 2008/0189788 A1 | 8/2008 | Bahl | |
| 2008/0195741 A1 | 8/2008 | Wynn et al. | |
| 2008/0225749 A1 | 9/2008 | Peng et al. | |
| 2009/0024550 A1 | 1/2009 | Wynn et al. | |
| 2009/0028082 A1 | 1/2009 | Wynn et al. | |
| 2009/0031125 A1* | 1/2009 | Bjorn | 713/155 |
| 2009/0147792 A1 | 6/2009 | Anschutz et al. | |
| 2009/0177801 A1 | 7/2009 | Chambers, Jr. et al. | |
| 2009/0222537 A1 | 9/2009 | Watkins et al. | |
| 2009/0222740 A1* | 9/2009 | Yuan | 715/742 |
| 2009/0279492 A1 | 11/2009 | Montemurro et al. | |
| 2010/0100951 A1 | 4/2010 | Kutt et al. | |
| 2010/0142484 A1 | 6/2010 | Bachmann et al. | |
| 2010/0153704 A1 | 6/2010 | Winslow | |
| 2010/0275249 A1 | 10/2010 | McCann et al. | |

FOREIGN PATENT DOCUMENTS

| | | |
|---|---|---|
| JP | 2003196241 | 7/2003 |
| JP | 2004310581 | 11/2004 |
| JP | 2005286783 | 10/2005 |
| WO | 0030285 | 5/2000 |
| WO | 03102730 | 12/2003 |
| WO | 2004097590 | 11/2004 |
| WO | 2005013582 | 2/2005 |
| WO | WO2005/096160 | 10/2005 |
| WO | 2010151692 | 12/2010 |

OTHER PUBLICATIONS

PCT International Search Report and Written Opinion dated Jun. 12, 2008, for International Application No. PCT/US07/19462.

PCT International Search Report and Written Opinion dated May 21, 2008, for International Application No. PCT/US07/19463.

PCT International Search Report and Written Opinion dated Dec. 3, 2008, for International Application No. PCT/US08/78191.

PCT International Search Report and Written Opinion dated Dec. 8, 2008, for International Application No. PCT/US08/78198.

PCT International Search Report and Written Opinion dated Nov. 20, 2009 for International Application No. PCT/US2009/060532, 8 pages.

PCT International Search Report and Written Opinion dated Mar. 2, 2010 for International Application No. PCT/US2010/021409, 9 pages.

Holtmanns et al., U.S. Appl. No. 60/818,517, filed Jul. 6, 2006, referenced in US 2008/0016230, 30 pages.

Office Action mailed Jul. 22, 2010 from U.S. Appl. No. 12/240,920, filed Sep. 29, 2008.

Office Action mailed May 30, 2008 from U.S. Appl. No. 11/899,739, filed Sep. 6, 2007.

Office Action mailed Aug. 25, 2009 from U.S. Appl. No. 11/899,739, filed Sep. 6, 2007.

Office Action mailed May 17, 2010 from U.S. Appl. No. 11/899,739, filed Sep. 6, 2007.

Office Action mailed Aug. 21, 2009 from U.S. Appl. No. 11/899,697, filed Sep. 6, 2007.

Office Action mailed May 12, 2010 from U.S. Appl. No. 11/899,697, filed Sep. 6, 2007.

Office Action mailed Mar. 23, 2011 from U.S. Appl. No. 12/240,920, filed Sep. 29, 2008.

Office Action mailed Dec. 23, 2008 from U.S. Appl. No. 11/899,739, filed Sep. 6, 2007.

Office Action mailed Apr. 6, 2011 from U.S. Appl. No. 11/899,739, filed Sep. 6, 2007.

Notice of Allowance mailed Oct. 31, 2011 from U.S. Appl. No. 11/899,739, filed Sep. 6, 2007.

Office Action mailed Jan. 14, 2011 from U.S. Appl. No. 11/899,697, filed Sep. 6, 2007.

Office Action mailed Apr. 7, 2011 from U.S. Appl. No. 11/899,697, filed Sep. 6, 2007.
Notice of Allowance mailed Nov. 4, 2011 from U.S. Appl. No. 11/899,697, filed Sep. 6, 2007.
Office Action mailed May 9, 2011 from U.S. Appl. No. 12/240,969, filed Sep. 29, 2008.
Notice of Allowance mailed Nov. 10, 2011 from U.S. Appl. No. 12/240,969, filed Sep. 29, 2008.
Search Report mailed Feb. 10, 2011 from European Serial No. 07837822.1 filed Sep. 6, 2007.
Search Report mailed Apr. 4, 2011 from European Serial No. 08833721.7 filed Sep. 29, 2008.
Search Report mailed Apr. 1, 2011 from European Serial No. 08834360.3 filed Sep. 29, 2008.
Search Report mailed Feb. 10, 2011 from European Serial No. 07837824.7 filed Sep. 6, 2007.
Search Report mailed Feb. 10, 2011 from European Serial No. 07837823.9 filed Sep. 6, 2007.
Zundt et al. "Seamless Handoff in community Based and Location Aware Heterogeneous Wireless Networks" 8th International Workshop on Mobile Multimedia conference, Oct. 5-8, 2003, pp. 1-5, XP002281321.
Search Report and Written Opinion mailed Aug. 11, 2010 from International Serial No. PCT/US2010/039092 filed Jun. 17, 2010.
Search Report and Written Opinion mailed Apr. 26, 2012 from International Serial No. PCT/US2012/025121 filed Feb. 14, 2012.
Search Report and Written Opinion mailed Aug. 30, 2010 from International Serial No. PCT/US2010/039859 filed Jun. 24, 2010.
Search Report mailed Feb. 6, 2013 from European Patent Application No. 09821134.5 filed Oct. 13, 2009.
McCann, Stephen et al., "Novel WLAN Hotspot Authentication," Fifth IEE International Conference on 3G Mobile Communication Technologies, Oct. 18, 2004, pp. 59-63.
Anton, B. et al., "Best Current Practices for Wireless Internet Service Provider (WISP) Roaming," Wi-Fi Alliance, Feb. 2003.
Examination Report mailed May 13, 2013 from European Patent Application No. 08833721.7 filed Sep. 29, 2008.
Examination Report mailed May 13, 2013 from European Patent Application No. 08834360.3 filed Sep. 29, 2008.
Search Report mailed May 13, 2013 from European Application No. 10732222.4 filed Jan. 19, 2010.

* cited by examiner

SYSTEMS AND METHODS FOR OBTAINING NETWORK ACCESS

CROSS-REFERENCE TO RELATED APPLICATIONS

The present application claims benefit of U.S. Provisional Patent Application No. 60/824,756 filed Sep. 6, 2006, and entitled "Network Credential Discovery Using DNS," which is hereby incorporated by reference. The present application is also related to co-pending U.S. patent application Ser. No. 11/899,697, entitled "System and Method for Acquiring Network Credentials," filed Sep. 6, 2007, and co-pending U.S. patent application Ser. No. 11/899,739, entitled "System and Method for Providing Network Credentials," filed Sep. 6, 2007, both of which are incorporated by reference.

BACKGROUND

1. Field of the Invention

Embodiments of the present invention are directed to networking and more particularly to providing a credential to a network device in order to access a communication network.

2. Related Art

Conventionally, hotspots may be established in areas where users are not known in advance. Examples of hotspots may comprise hotels, coffee shops, campuses, and other public or private locations where digital device users may be interested in connecting to a communication network such as the Internet. Typically, these hotspots are wireless.

In many embodiments, the hotspots require the users to be authorized. Thus, the user is typically required to perform a login process before the user's digital device is allowed access to the hotspot. A common login process comprises opening a web browser and connecting to a captive portal website where a user name and password may be entered. Another process may require the user to provide payment information. After confirmation of the payment, an access point will allow the user's digital device access to the hotspot.

Unfortunately, not all digital devices have browser capability. Such digital devices may include, for example, Wi-Fi, VoIP phones, cameras, and MP3 players. These digital devices, typically, do not include a web browser or mechanism to enter credentials or payment information. As a result, it is difficult for these digital devices to use hotspots.

One conventional solution to this problem is to pre-configure credentials into the digital device. However, this would require that credentials for all hotspots that the user plans on using be known at the time of configuration. It may also require that the user be registered with, or subscribe to, all the hotspots. Furthermore, new hotspots cannot be accessed by this preconfigured digital device unless the digital device is updated (e.g., downloaded to the digital device over a fully functional network connection). A yet further disadvantage is that the digital device must comprise enough memory to store all the credential information.

SUMMARY OF THE INVENTION

Embodiments of the present invention provide systems and methods for providing a network credential in order to access a communication network are provided. The network device may comprise an access point for the communication network.

In exemplary embodiments, the digital device may need to obtain a network credential to provide to a network device. Accordingly, a credential engine of the digital device may generate a credential request to obtain the network credential. The credential request may be sent to a credential server. A credential request response may then be received by the credential engine and analyzed to retrieve the network credential. In some embodiments, the credential request response may also comprise login procedural information.

The digital device attempting to access the communication network may receive an authentication request from the network device upon attempting to access the communication network. An authentication record based on the authentication request is retrieved by an authentication record module of the digital device. In some embodiments, the retrieval may be based on the login procedural information received in the credential request response.

The credential is then provided within the authentication record and transmitted as an authentication response to the network device. Upon authentication by the network device, the digital device is provided access to the communication network.

DETAILED DESCRIPTION OF EXEMPLARY EMBODIMENTS

Embodiments of the present invention provide systems and methods for accessing a communication network via a hotspot. In exemplary embodiments, a digital device is associated with a user. A network device (e.g., hotspot access point) requires the digital device to authenticate itself with the network device in order to use the hotspot. Typically, the authentication may comprise a request for a network credential from the digital device which is verified by the network device prior to granting access. In one embodiment, the communication network comprises the Internet.

Figure 1:
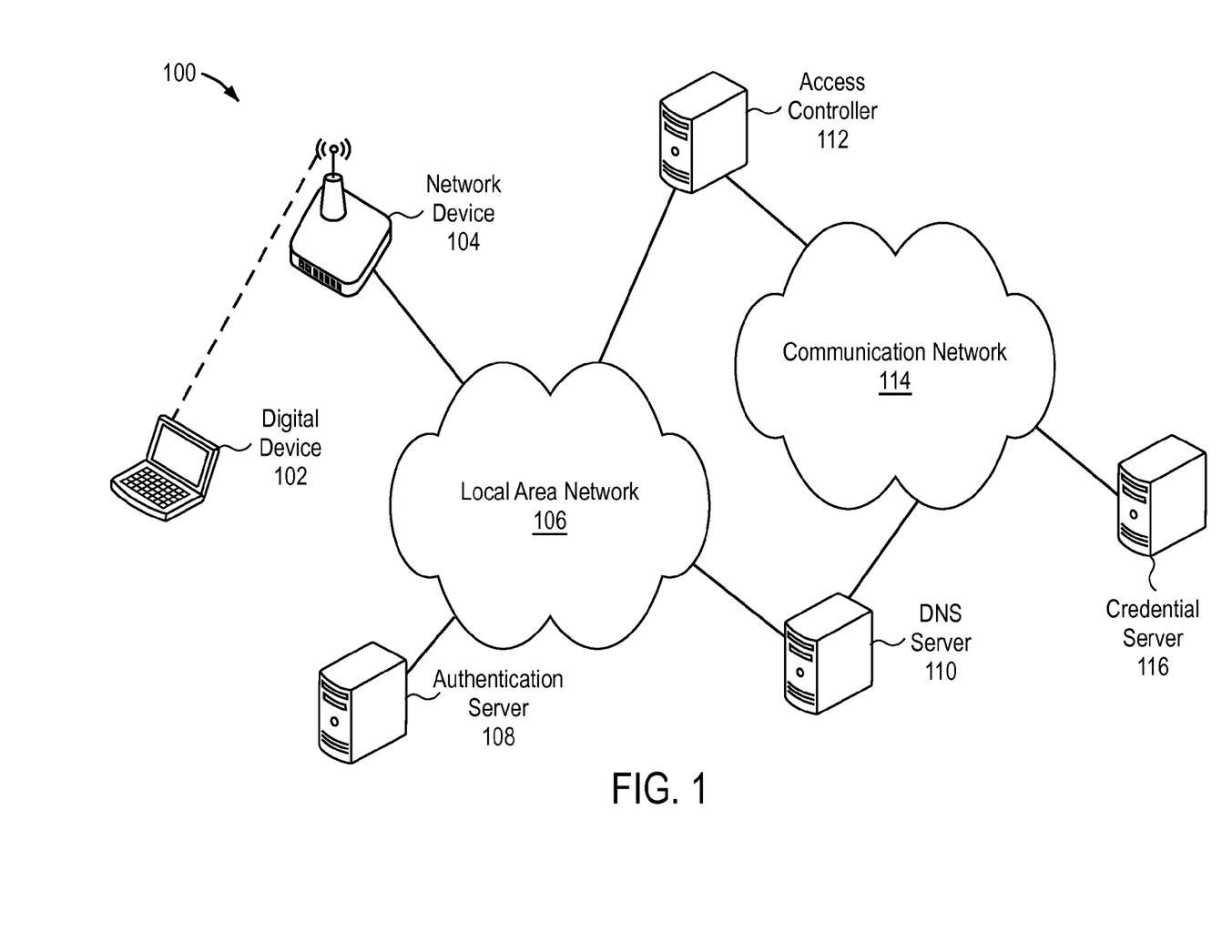
FIG. 1 is a diagram of an environment in which embodiments of the present invention may be practiced.

FIG. 1 illustrates a diagram of an environment 100 in which embodiments of the present invention may be practiced. In exemplary embodiments, a user with a digital device 102 enters a hotspot. The digital device 102 may automatically transmit a credential request as a standard protocol over a network device 104. The credential request may be forwarded to a credential server 116 which, based on the information contained within the credential request, transmits a credential request response back to the digital device 102. The credential request response contains network credentials which the digital device 102 may provide to the network device 104, the authentication server 108, or the access controller 112 to obtain access to the communication network 114.

In various embodiments, a hotspot comprises the network device 104, the authentication server 108, the DNS server 110, and the access controller 112 which are coupled to the local area network 106 (e.g., a "walled garden"). The network device 104 may comprise an access point which allows the digital device 102 to communicate with the authentication server 108, the DNS server 110, and the access controller 112 over the local area network 106. The digital device 102 may comprise a laptop, mobile phone, camera, personal digital assistant, or any other computing device. The authentication server 108 is a server that requires network credentials from the digital device 102 before allowing the digital device 102 access to communicate over the communication network 114. The network credentials may comprise a username, password, and login procedure information. The DNS server 110 provides DNS services over the local area network 106 and may relay requests to other DNS servers (not shown) across the communication network 114. The access controller 112 is an access device such as a router or bridge that can allow communication between devices operationally coupled to the network device 104 with devices coupled to the communication network 114.

Although the hotspot in FIG. 1 depicts separate servers coupled to the local area network 106, those skilled in the art will appreciate that there may be any number of devices (e.g., servers, digital devices, access controllers, and network devices) coupled to the local area network 106. In some embodiments, the local area network 106 is optional. In one example, the authentication server 108, the DNS server 110, and the access controller 112 are coupled directly to the network device 104. In various embodiments, the authentication server 108, the DNS server 110, and the access controller 112 may be combined within one or more servers or one or more digital devices. Further, although FIG. 1 depicts wireless access, the digital device 102 may be coupled to the network device 104 wirelessly or over wires (such as 10baseT).

In order to access the communication network 114, the authentication server 108 may require the digital device 102 to provide one or more network credentials for access to the hotspot. The network credential may comprise, for example, a username and password for an account associated with the hotspot. In alternative embodiments, network credentials other than a user name and password may be utilized.

According to exemplary embodiments, the digital device 102 may dynamically acquire the network credentials from the credential server 116. The digital device 102 may send a credential request comprising an identity of the digital device 102 (or the user of the digital device 102) and details about the network device 104 (e.g., name of the network device 104 or Wi-Fi service provider) to the credential server 116.

In one example, when the digital device 102 enters the hotspot, the network device 104 may provide an IP address to which DNS queries may be submitted, for example, via DHCP (Dynamic Host Configuration Protocol). The credential request may be formatted as a standard protocol. In an example, the credential request may be formatted as a DNS request. The credential request may be a text record request (e.g., TXT), which comprises a standard record type such that the network infrastructure (e.g., the access controller 112) will not block the request.

In some embodiments, the credential request is received by the DNS server 110 which may forward the credential request to the credential server 116 for the network credential. In exemplary embodiments, the credential server 116 may perform a lookup to determine the proper network credential(s) to send back to the DNS server 110 which forwards the network credential back to the requesting digital device 102. In various embodiments, the proper network credential(s) are sent from the credential server 116 to the digital device 102 over the same path as the transmission of the credential request.

More details regarding the process for determining and providing the network credentials at the credential server 116 are provided in co-pending U.S. patent application Ser. No. 11/899,739, entitled "System and Method for Providing Network Credentials," filed Sep. 6, 2007. Although only one DNS server 110 is depicted within FIG. 1, the credential request may be forwarded through any number of servers, including but not limited to DNS servers, prior to being received by the credential server 116. In other embodiments, the credential request is forwarded directly from the network device 104 to the credential server 116.

In some embodiments, a credential request response from the credential server 116 may comprise the username, password and/or login procedure information. The login procedural information may comprise, for example, HTML form element names, submission URL, or submission protocol. In some embodiments, the network credential response may be encrypted by the credential server 116 using an encryption key associated with the digital device 102 prior to transmission back to the digital device 102.

Once the digital device 102 receives the network credential response, the digital device 102 may submit the network credential (retrieved from the network credential response) to the network device 104 in an authentication response. In exemplary embodiments, the authentication response may be forwarded to an authentication server 108 for verification. In some embodiments, the authentication server 108 may comprise an AAA server or RADIUS server.

It should be noted that FIG. 1 is exemplary. Alternative embodiments may comprise more, less, or functionally equivalent components and still be within the scope of present embodiments. For example, as previously discussed, the functions of the various servers (e.g., DNS server 110, credential server 116, and authentication server 108) may be combined into one or two servers. That if, for example, the authentication server 108 and the DNS server 110 may comprise the same server, or the functionality of the authentication server 108, the DNS server 110, and the access controller 112 may be combined into a single device.

Figure 2:
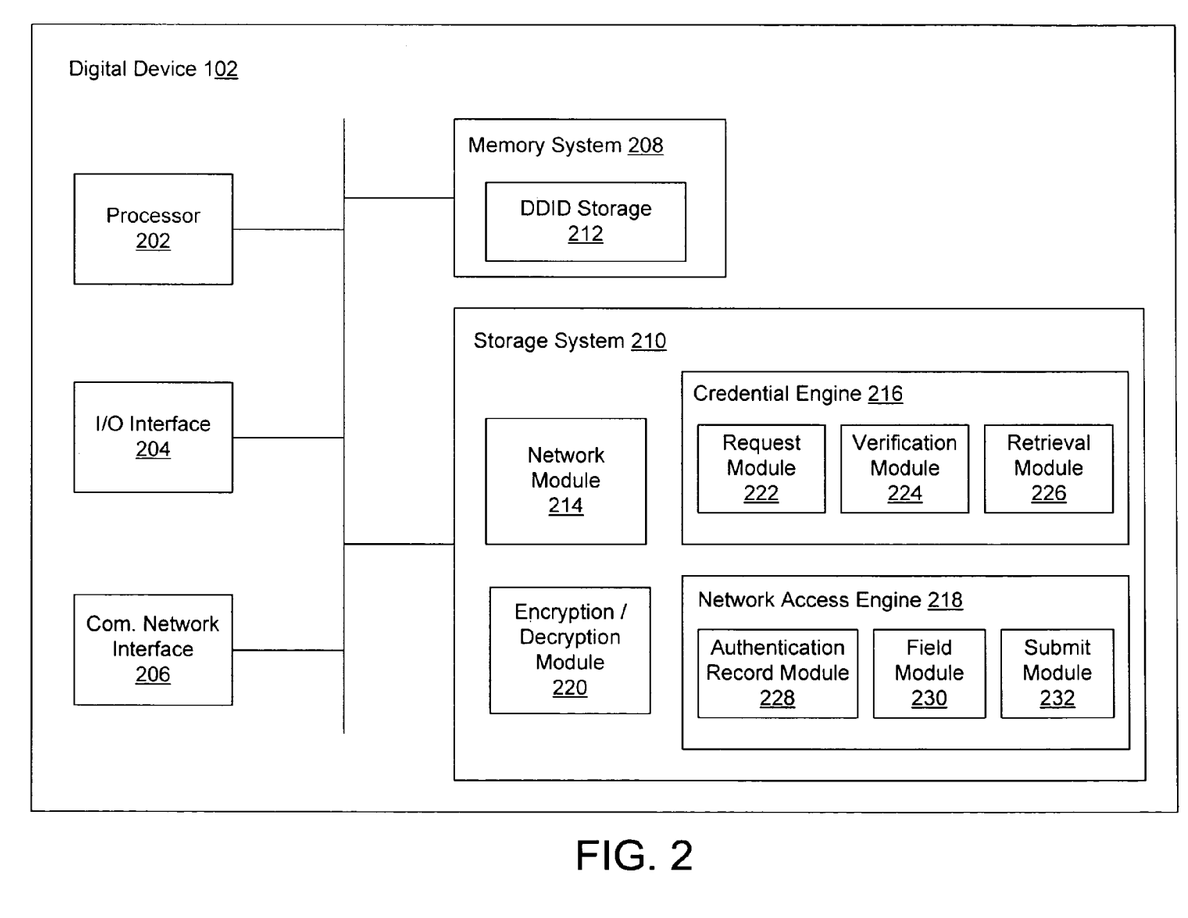
FIG. 2 is a block diagram of an exemplary digital device.

Referring now to FIG. 2, the exemplary digital device 102 is shown in more detail. In exemplary embodiments, the digital device 102 comprises a processor 202, input/output (I/O) interface(s) 204, a communication network interface 206, a memory system 208, and a storage system 210. The I/O interfaces 204 may comprise interfaces for various I/O devices such as, for example, a keyboard, mouse, and display device. The exemplary communication network interface 206 is configured to allow the digital device 102 to allow communications with the communication network 114 and/or the local area network 106. The storage system 210 may comprise various databases or storage, such as, for example, a DDID storage 212 which stored a digital device identifier for the digital device 102.

The storage system 210 comprises a plurality of modules utilized by embodiments of the present invention to access the hotspot. In one embodiment, the storage system 210 comprises a network module 214, a credential engine 216, a network access engine 218, and an encryption/decryption module 220. Alternative embodiments of the digital device 102 and/or the memory system 208 may comprise more, less, or functionally equivalent components and modules.

The network module 214 may be configured to perform operations in order to access the local area network 106. In some embodiments, the network module 214 may receive and transmit communications associated with accessing the hotspot. The network module 214 may also perform a search for the communication network 114. For example, if the network module 214 determines that there is no access to the communication network 114, embodiments of the present invention herein may be practiced.

The exemplary credential engine 216 is configured to obtain the network credential. In exemplary embodiments, the credential engine 216 may comprise a request module 222, a verification module 224, and a retrieval module 226. The exemplary request module 222 is configured to generate a credential request for the network credential. The credential engine 216 may also receive a credential request response (via the network module 214) and verify, via the verification module 224, that the credential request response is from the credential server 116. The exemplary retrieval module 226 is configured to analyze the credential request response to obtain the network credentials. The process for obtaining the network credential will be discussed in more details in connection with FIG. 4 below.

The exemplary network access engine 218 is configured to receive an authentication request and provide an authentication response to the network device 104 comprising the network credential. The network access engine 218 may comprise an authentication record module 228, a field module 230, and a submit module 232. The exemplary authentication record module 228 is configured to identify an authentication record associated with the digital device 102. The field module 230 identifies fields or elements in the authentication record and provides the proper element inputs (e.g., network credential) in the fields. The submit module 232 is configured to automatically submit the authentication record to the network device 104 as the authentication response. The process for providing the authentication response is discussed in more details in connection with FIG. 5 below.

The encryption/decryption module 220 is configured to encrypt or decrypt communications sent/received by the digital device 102. In some embodiments, the credential request response may be encrypted by the credential server 116. In these embodiments, the encryption/decryption module 220 will decrypt the credential request response. In some embodiments, the encryption/decryption module 208 may establish a secure communication via SSL and/or https between the digital device 102 and the authentication server 108. It should be noted that, in accordance with some embodiments, the encryption/decryption module 220 may be optional or not required.

Figure 3:
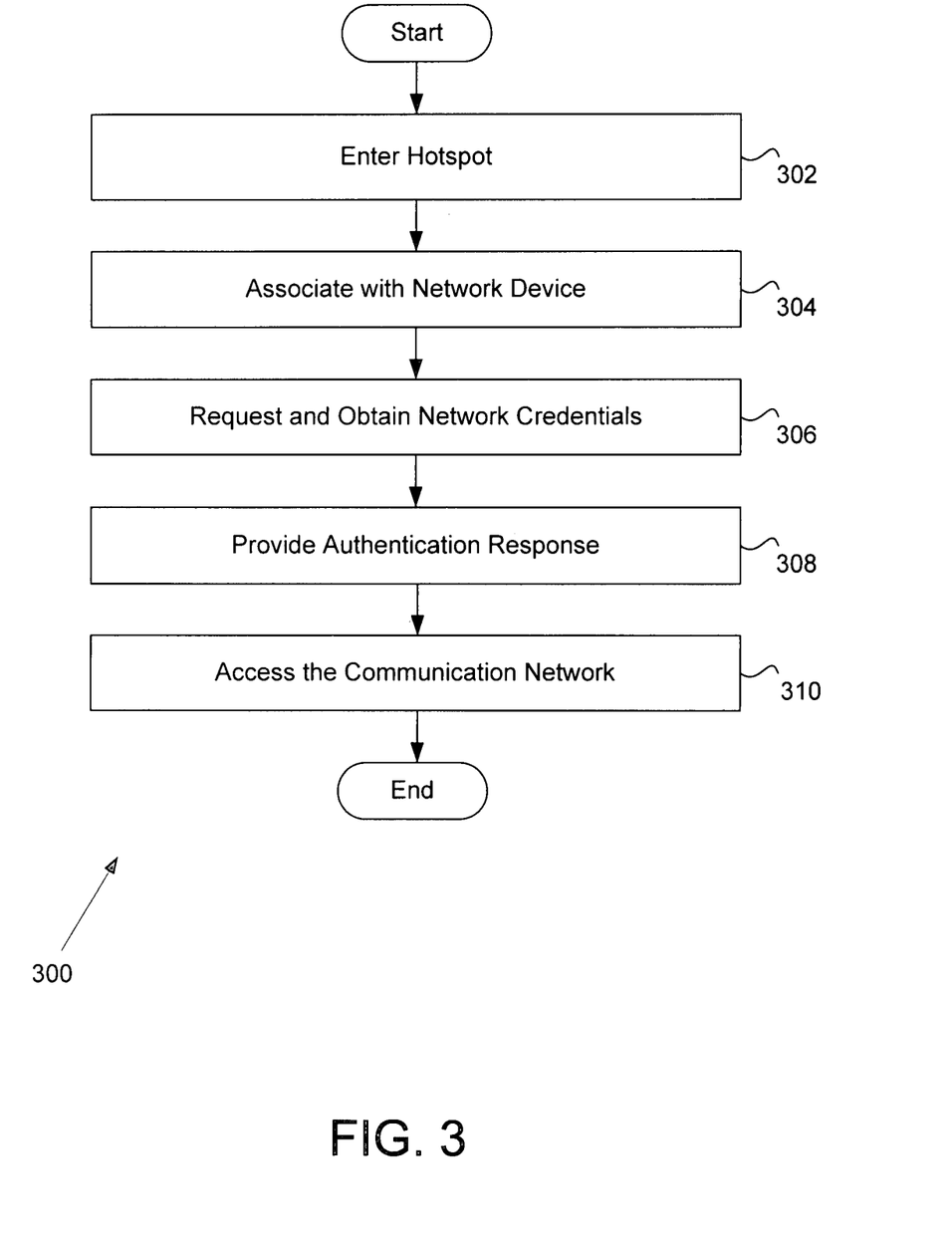
FIG. 3 is a flowchart of an exemplary method for providing network access to the digital device.

Referring now to FIG. 3, a flowchart 300 of an exemplary method for providing communication network access to the digital device 102 is shown. In step 302, the digital device 102 enters a hotspot. For example, a user may turn on their digital device 102 in a coffee shop or hotel where communication network access (e.g., hotspot) is available. Once the activated digital device 102 enters the hotspot, the digital device 102 may sense the hotspot. For example, the network module 214 may automatically attempt to access the communication network 114.

Once operational within the hotspot, the network module 214 of the digital device 102 may query the network device 104 of the hotspot in step 304. In exemplary embodiments, the network device 104 comprises the access point for the hotspot. By querying the network device 104, the network module 214 may receive one or more IP addresses associated with a central server (e.g., the DNS server 110) which may be associated with a service provider. Other information may also be received such as DNS records and gateway records. In exemplary embodiments, the IP addresses may be provided via DHCP. In one embodiment, the network module 214 may attempt to access a known server to determine whether there is live connection to the communication network 114.

In step 306, the digital device 102 requests and obtains the network credential from the DNS server 110. The process of step 306 will be discussed in more details in connection with FIG. 4 below.

Once the digital device 102 obtains the network credential, the digital device 102 may provide an authentication response to the network device 104 in order to access the communication network 114 via the network device 104 in step 308. The process of step 308 will be discussed in more details in connection with FIG. 5 below.

The network device 104 will then attempt to authenticate the digital device 102 by comparing the network credential received in the authentication response. According to one embodiment, the network device 104 may authenticate the network credential utilizing the authentication server 108. For example, the network credential may be compared against a database of network credentials stored or associated with the authentication server 108.

If the network credentials are authenticated, the digital device 102 will be granted access to the communication network in step 310. In one embodiment, the authentication server 108 may instruct the access controller 112 to allow the digital device 102 access to the communication network 114.

Figure 4:
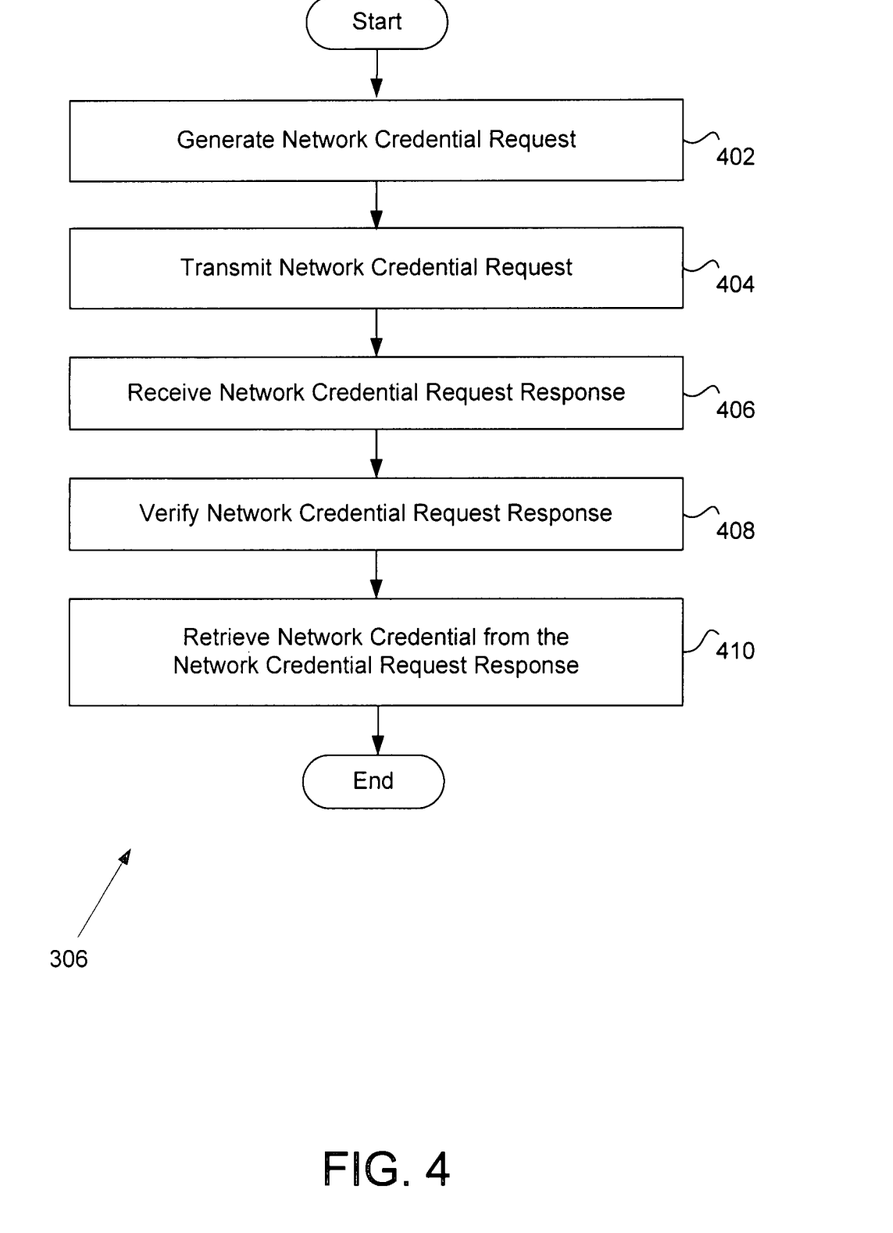
FIG. 4 is a flowchart of an exemplary method for obtaining network credentials.

Referring now to FIG. 4, a flowchart of an exemplary method for obtaining the network credential (step 306) is shown. In step 402, the network credential request is generated. In accordance with one embodiment, the request module 222 may construct a string using a DNS structure that may already be on a platform of the digital device 102. The exemplary DNS string generated by the request module 222 is discussed in more details in connection with FIG. 8 below.

In step 404, the generated credential request is sent by the digital device 102. In exemplary embodiments, the digital device 102 utilizes one of the IP addresses (of the DNS server 110) received from the network device 104. The DNS string is then transmitted to the selected DNS IP address received by the network module 214.

In step 406, the digital device 102 receives the credential request response. In exemplary embodiments, the credential request response is received from the credential server 116 via the DNS server 110. The credential request response may be encrypted. In these embodiments, the encryption/decryption module 220 will decrypt the credential request response.

The credential request response is then verified in step 408. In exemplary embodiments, the credential request response is encrypted. The digital device 102 (e.g., the verification module 224) may decrypt the credential request response. In some embodiments, the credential request response is digitally signed. The digital device 102 (e.g., the verification module 224) may verify the authenticity of the credential request response by decrypting the digital signature or decrypting the credential request response. In alternative embodiments, other mechanisms may be used by the verification module 224 to authenticate the credential request response.

The network credentials may then be retrieved in step 410. In exemplary embodiments, the retrieval module 226 will analyze the credential request response to obtain the network credentials embedded therein. In one example, the retrieval module 226 identifies data within the retrieval module 226 (e.g., via delimited fields) and may retrieve a encryption key, a user name, a password, a form identifier, or the like.

Figure 5:
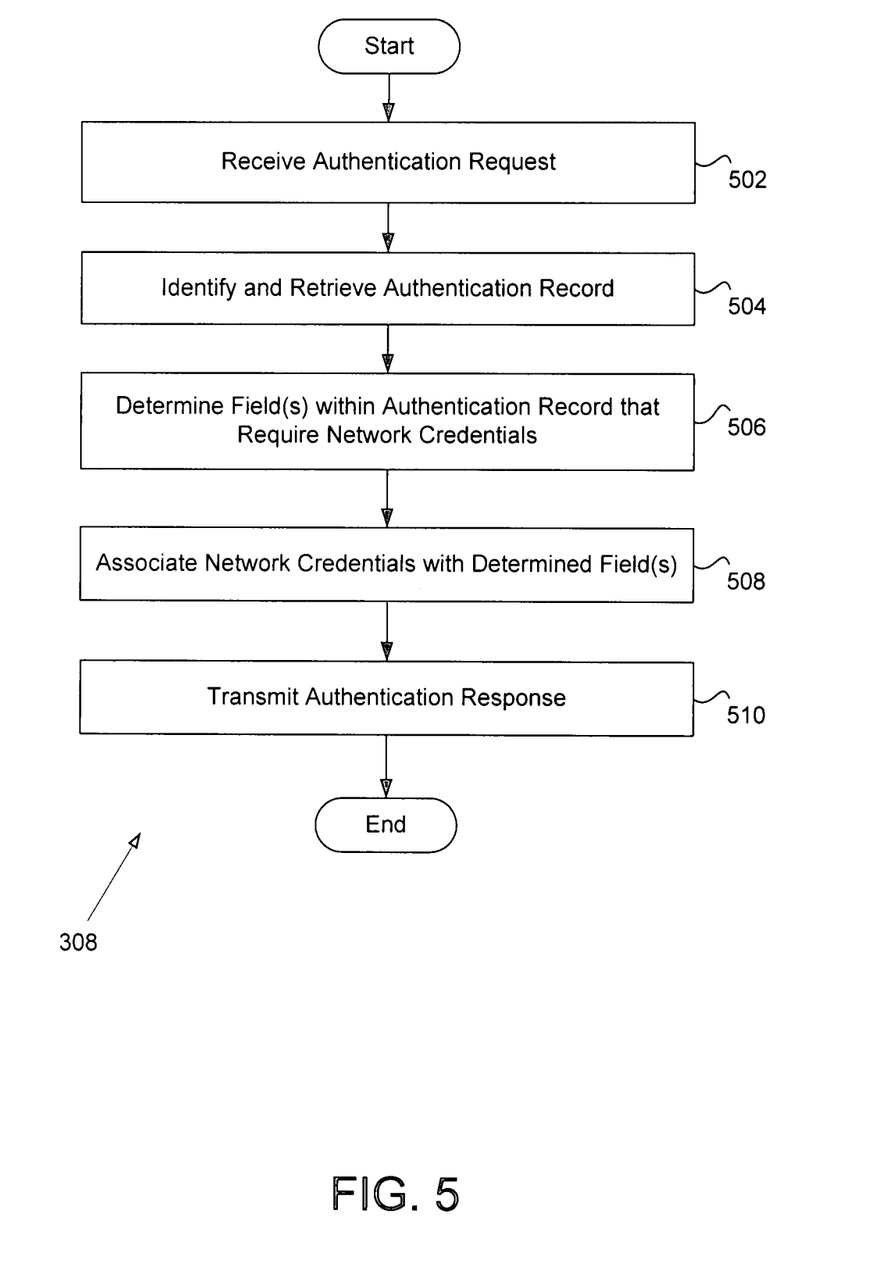
FIG. 5 is a flowchart of an exemplary method for authenticating the digital device with the network device.

Referring now to FIG. 5, a flowchart of an exemplary method for authenticating the digital device 102 (e.g., providing an authentication response of step 308) with the network device 104 is shown. In step 502, an authentication request is received from the network device 104 by the network module 214.

The authentication record module 228 then identifies and retrieves an authentication record in step 504. In exemplary embodiments, the authentication request from the network device 104 may comprise HTML form element names associated with an authentication record in which the network credential may be provided. The authentication record module 228 may parse out the form(s)/authentication record(s) needed for logging in with the network device 104, for example, via the name or identifier (e.g., login form).

In step 506, the field module 230 determines field(s) or elements(s) within the authentication record that require an authentication input (e.g., network credential). According to exemplary embodiments, the field module 230 will analyze the authentication records identified and retrieved in step 504 to find input fields. As such, a list of these input fields may be generated (e.g., a linked list of forms and input fields).

In step 508, network credentials are associated with the determined field(s) or element(s). In exemplary embodiments, the field module 230 will associate a proper network credential with each input element. The association may be based on an input name or identifier found in the script of the HTML of the authentication request. For example, the authentication record may comprise an input element requesting a username or an e-mail address.

An authentication response comprising the authentication record is transmitted in step 510. According to one embodiment, once the network credential(s) have been associated with the authentication record by the field module 230, a post is generated. In some embodiments, the authentication record may comprise a plurality of hidden values used to identify the digital device 102 and session information in addition to network access credentials. Such information and values may include, for example, network device MAC address, session identifier, and other values which may be stored in hidden form elements.

It should be noted that in some embodiments, the authentication request may not be the first webpage presented by the network device 104. For example, if a user is attempting to sign on at a coffee shop, the first webpage may be a welcome webpage from the coffee shop. This welcome webpage may provide a plurality of login options. In these embodiments, a unique fragment of a URL associated with the authentication request may be embedded on the first webpage. As a result, the digital device 102 (e.g., the network module 214) may skim through the webpage to find the fragment. Once the fragment is found, the digital device 102 will perform a get on this subsequent webpage (e.g., authentication request).

Figure 6:
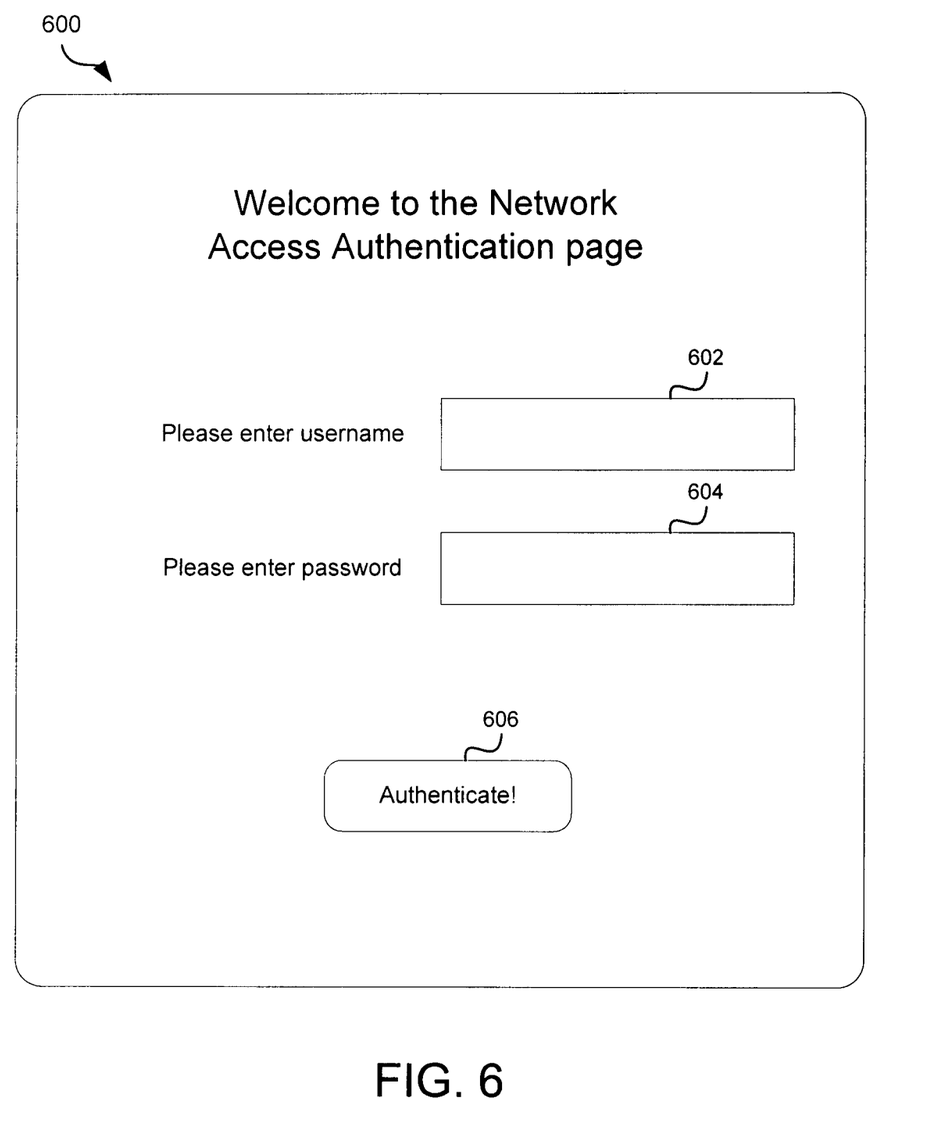
FIG. 6 is a display of an exemplary network access authentication page, according to one embodiment of the present invention.

Referring now to FIG. 6, an exemplary authentication page 600 (e.g., authentication record) is shown. The authentication page 600 may comprise a username field 602 and a password field 604. In some embodiments, the username field 602 may be replaced with an e-mail field or any other field for providing a unique identifier associated with the digital device 102 or associated user. According to exemplary embodiments of the present invention, the field module 230 may automatically fill in the username field 602 and password field 604 with the network credentials.

The authentication page 600 may also comprise an authenticate selector 606 (e.g., a submit selector or button). The authenticate selector 606 will submit the network credentials (e.g., user name and password) to the network device 104. In some embodiments, the submit module 232 may automatically activate the authenticate selector 606 once the network credentials have been associated with their respective fields 602 and 604.

Figure 7:
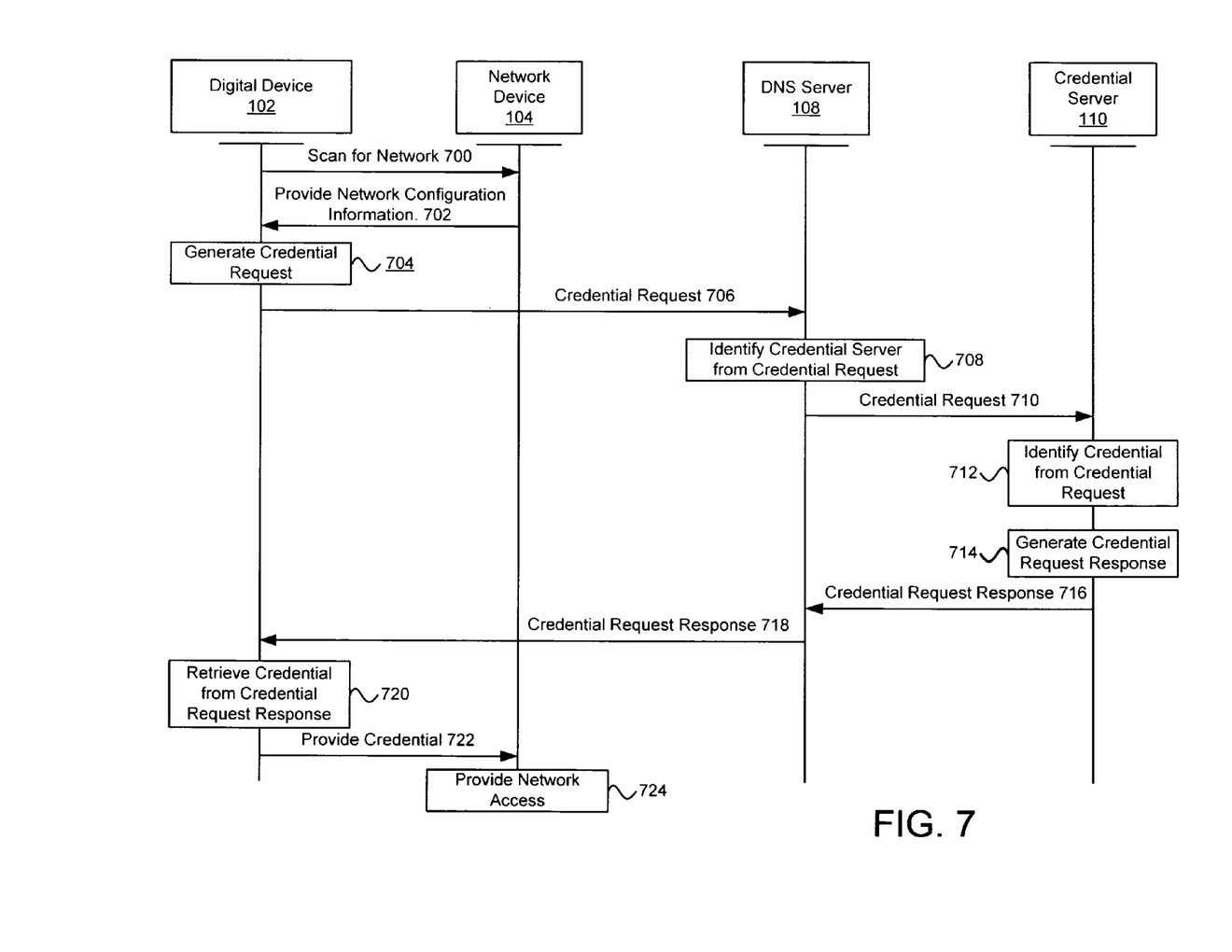
FIG. 7 is a flow diagram of an exemplary process for providing network access to the digital device.

FIG. 7 illustrates a flow diagram of an exemplary process for providing network access to the digital device 102. When the digital device 102 first enters into a hotspot, the digital device 102 (e.g., network module 214) may scan for the communication network 114 in step 700. As a result of the scan, the network device 104 may provide network configuration information in step 702. The network configuration information may comprise one or more IP address for access to the DNS server 110.

In step 704, a credential request is generated by the digital device 102. As discussed above in connection with FIG. 4, the request module 222 may generate the credential request. Subsequently, the credential request is sent to the DNS server 110 in step 706 using one of the IP addresses previously received from the network device 104.

Based on the credential request, the credential server 116 is identified by the DNS server 110 in step 708.

The credential server 116 then identifies the network credential needed based on the credential request in step 712. For example, the credential request may comprise a unique identifier for the digital device 102. This unique identifier along with the location identifier may be compared against a table of such identifiers at the credential server 116 to determine the proper network credential. A credential request response is then generated in step 714 and sent back to the DNS server 110 in step 716. The DNS server 110 forwards the credential request response back to the digital device in step 718.

The digital device 102 may then retrieve the network credentials from the credential request response in step 720. In exemplary embodiments, the retrieval module 226 will analyze the credential request response to retrieve the network credential embedded therein.

The network credential may then be provided to the network device 104 in step 722. An exemplary method for providing the network credentials to the network device 104 is discussed in connection with FIG. 5 above. Upon verifying the network credentials, the network device 104 provides network access to the digital device 102 in step 724.

Figure 8:
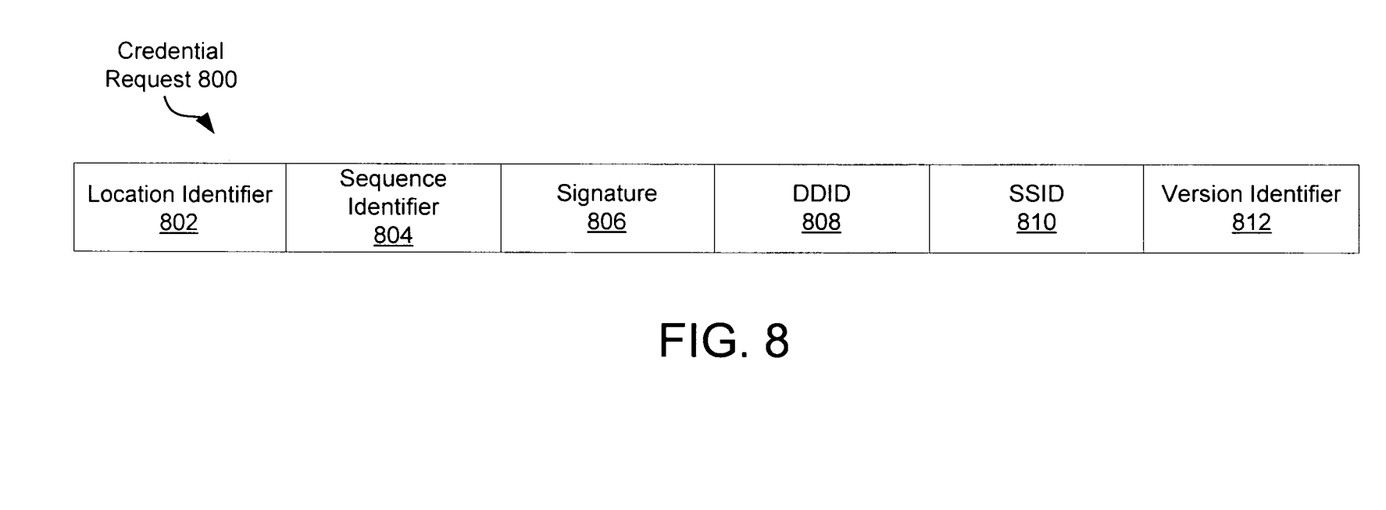
FIG. 8 is a block diagram of an exemplary credential request.

Referring now to FIG. 8, an exemplary credential request 800 is shown in more details. According to exemplary embodiments, the request module 222 may generate the credential request 800. In one embodiment, the credential request 800 may be a DNS string having a structure that comprise a location identifier 802, a sequence identifier 804, a signature 806, a digital device identifier (DDID) 808, a service set identifier (SSID) 810, and a version identifier 812.

The optional location identifier 802 may indicate a physical or geographic location of the digital device 102, the network device 104, the authentication server 108, or the access controller 112. In various embodiments, the location identifier 402 may be used by the credential server 116 to track the usage of hotspots, users of the digital device 102, as well as the digital device 102.

The sequence identifier 804 may comprise any number or set of numbers used to correspond to a subsequent request to the credential server 116 to determine if the login is successful. That is, the sequence identifier 804 provides a correlation mechanism by which verification of the login process may be made by the credential server 116.

In exemplary embodiments, the signature 806 comprises a cryptographic signature that is utilized to prevent spoofing. The signature 406 of the request from digital device 102 is verified by the credential server 116. If the signature 406 is not valid, then the request is rejected by the credential server 116.

The DDID 808 comprises a unique identifier of the digital device 102. For example, the DDID 808 may comprise a MAC address or any other universally unique identifier of the digital device 102. In exemplary embodiments, the DDID is retrieved from the DDID storage 212.

The SSID 810 comprises an identifier of the network access point or Wi-Fi service provider. For example, the SSID 810 may comprise the name of the service provider, or the name of the venue operating the network device 104.

The version identifier 812 may identify the protocol or format of the credential request 800. For example, a digital device may generate the credential request 800 and organize the data in a number of different formats. Each different format may be associated with a different version identifier. In some embodiments, the components of the credential engine 216 and the network access engine 218 may be updated, reconfigured, or altered over time, which may affect the structure of the credential request 800. As a result, the credential server 116 may receive a plurality of credential requests 800 which are formatted differently. The credential server 116 may access the required information from each credential request based on the respective version identifier.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method comprising:
   receiving, from a network device, an authentication request to access a network;
   providing a credential request to a credential server over the network device;
   receiving a credential request response from the credential server, the credential request response comprising login procedural information and a network credential, the credential request response being based on the credential request;
   identifying a form associated with the authentication request based on the login procedural information from the credential request response;
   identifying a field associated with the form;
   preparing an authentication response in response to the authentication request, the authentication response comprising the network credential associated with the identified field based on the login procedural information; and
   transmitting the authentication response to the network device to obtain network access.

2. The method of claim 1, further comprising:
   identifying an authentication record associated with the authentication request;
   determining an input element associated with the authentication request based on the authentication record; and
   providing an input response associated with the input element within the authentication response.

3. The method of claim 2, further comprising:
   receiving a webpage from the network device; and
   identifying the authentication record based on the webpage.

4. The method of claim 1, wherein providing the credential request to the credential server over the network device comprises transmitting the credential request to the credential server over a standard protocol of the network device.

5. The method of claim 1, further comprising verifying the credential request response.

6. The method of claim 1, further comprising decrypting the credential request response.

7. The method of claim 1, further comprising verifying an authenticity of the network device.

8. The method of claim 1, wherein the network credential comprises a username.

9. The method of claim 1, wherein the authentication request comprises a webpage.

10. A system comprising:
    a processor;
    a network module configured to receive an authentication request from a network device to access a network; and
    a network access engine configured to:
      provide a credential request to a credential server over the network device;
      receive a credential request response from the credential server, the credential request response comprising login procedural information and a network credential;
      identify a form associated with the authentication request based on the login procedural information from the credential request response;
      identify a field associated with the form;
      prepare an authentication response comprising the network credential associated with the identified field based on the login procedural information; and
      transmit the authentication response to the network device to obtain network access.

11. The system of claim 10, wherein the network access engine is further configured to identify an authentication record associated with the authentication request, determine an input element associated with the authentication request based on the authentication record, and provide an input response associated with the input element within the authentication response.

12. The system of claim 11, wherein the network module is further configured to receive a webpage from the network device and the network access engine is further configured to identify the authentication record based on the webpage.

13. The system of claim 10, wherein the network access engine configured to provide the credential request to the credential server over the network device comprises the network access engine configured to provide the credential request to the credential server over a standard protocol of the network device.

14. The system of claim 13, wherein the standard protocol is a DNS protocol.

15. The system of claim 10, wherein the system further comprises a credential engine configured to authenticate the credential request response.

16. The system of claim 10, wherein the system further comprises a credential engine configured to decrypt the credential request response.

17. The system of claim 10, wherein the network module is further configured to verify an authenticity of the network device.

18. The system of claim 10, wherein the network credential comprises a username.

19. A non-transitory computer readable medium having embodied thereon a program, the program being executable by a processor for performing a method, the method comprising:
- receiving, from a network device, an authentication request to access a network;
- providing a credential request to a credential server over the network device;
- receiving a credential request response from the credential server, the credential request response comprising login procedural information and a network credential;
- identifying a form associated with the authentication request based on the login procedural information from the credential request response;
- identifying a field associated with the form;
- preparing an authentication response comprise the network credential associated with the identified field based on the login procedural information; and
- transmitting the authentication response to the network device to obtain network access.

20. The non-transitory computer readable medium of claim 19, wherein the method further comprises identifying an authentication record associated with the authentication request, determining an input element associated with the authentication request based on the authentication record, and providing an input response associated with the input element within the authentication response.

21. The non-transitory computer readable medium of claim 19, wherein providing the credential request to the credential server over the network device comprises providing the credential request to the credential server over a standard protocol of the network device.

22. The non-transitory computer readable medium of claim 19, the method further comprising verifying the credential request response.

23. The non-transitory computer readable medium of claim 19, the method further comprising decrypting the credential request response.

24. The non-transitory computer readable medium of claim 19, the method further comprising verifying an authenticity of the network device.

25. The non-transitory computer readable medium of claim 19, wherein the network credential comprises a username.

26. The non-transitory computer readable medium of claim 20, the method further comprising:
- receiving a webpage from the network device; and
- identifying the authentication record based on the webpage.

27. The non-transitory computer readable medium of claim 19, wherein the authentication request comprises a webpage.

* * * * *